Patented June 20, 1950

2,512,566

UNITED STATES PATENT OFFICE 2,512,566

METHOD OF STERILIZING SMALL QUANTITIES OF WATER

Henry Clay Marks, Glen Ridge, and Frede Bernhardt Strandskov, Belleville, N. J., assignors to Wallace & Tiernan Products, Inc., Belleville, N. J., a corporation of New Jersey No Drawing. Application August 9, 1947, Serial No. 767,854

8 Claims. (Cl. 210—28)

Our present invention relates to a method of sterilizing small quantities of water for drinking or other purposes. This process is useful for small supplies or batches of water, such as those contained in Army canteens, for hikers or sportsmen. It is also useful for sterilizing the water in batches or on a continuous flow basis in domestic water softening units at a time when the exchange material is being replenished or regenerated. It may also find further possible use on small water supplies for individual farms and estates.

Many highly efficient systems, including both apparatus and processes and using various types of sterilizing agents, have been developed for the treatment of large quantities of water, such as are used in city water supplies. These processes may and often are highly refined and are subject to accurate control. They are used normally in the treatment of a large water supply which is fairly uniform as to its requirements for sterilization.

The present invention seeks to fill a need where the requirements are basically different, i. e., where relatively small quantities of water which may vary widely in sterilization requirements are to be handled, where the personnel to conduct the sterilization process are usually unskilled and unscientific and where no facilities are available for careful analysis or control of the process.

In meeting this problem as to sterilizing small quantities of water, it has been proposed to supply a relatively large dose of chlorine, so that sterilization occurs almost instantaneously, and further so as to overcome the effect of uncontrollable variations in the demand for sterilization. However, it has been found that when using this method the concentration of chlorine necessary to accomplish this purpose is so large, i. e. the excess available chlorine remaining after sterilization is complete, is so large, that the resulting taste and smell of the water is highly objectionable to the average person. In order to overcome this objectionable taste and odor, it has been proposed to introduce into or otherwise to make available to the water some de-chlorinating agent, after the chlorine has had a reasonable time in which to effect the sterilization. Various arrangements have been proposed for effecting this result. The resultant water is sterilized and palatable.

These prior art methods are, however, subject to certain further objections, namely that the de-chlorination process serves to convert all the chlorine left over at the time de-chlorination is started into an inactive form such as a soluble chloride. As such, there is no protection in the water so treated against subsequent contamination. The ideal process or method, which the present invention seeks to provide, is to employ a large excess of chlorine for rapid and complete sterilization followed by conversion of the chlorine remaining after such sterilization into a form which is substantially tasteless and odorless, but which nevertheless is available as active chlorine for the purpose of coping with any subsequently introduced contaminating matter. Other and more detailed objects of the present invention will become apparent as the description proceeds and from the appended claims.

The present process generally is carried out by first adding available chlorine in a suitable form and in relatively large doses, such as to provide effective sterilization. Such a concentration broadly is usually at least 5 parts per million, seldom over 100 parts per million, and preferably is from about 10 to about 50 P. P. M. available chlorine in the water to be sterilized prior to the consumption of any of this chlorine in its sterilization action. Then after a sufficient contact period provided for the completion of the sterilization, and which in the usual course is from about 3 to about 20 minutes, a chemical agent is added to convert any remaining available chlorine into a form which is tasteless and odorless.

The chlorine in accordance with the present invention may be added either in the form of an aqueous solution of chlorine or some water soluble hypochlorite or an aqueous solution thereof. Many commercially available sources of active chlorine of this clas are known, including solid hypochlorite in powder or tablet form. In general, it is not satisfactory to add the chlorine in the form of a chloramine for reasons which will appear hereinafter.

The chemical agent which is added for converting the available chlorine into a tasteless and odorless form, which is, however, still active as a disinfectant, is hydrazodicarbonamidine, which is usually added in the form of one of its salts. Any water-soluble salt of hydrazodicarbonamidine may be used, the sulfate being preferred, but the hydrochloride, nitrate and acetate being examples of others which are acceptable and which are contemplated for use in accordance with the present invention. The formula for hydrazodicarbonamidine sulfate is as follows:

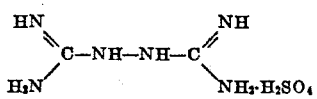

The hydrazodicarbonamidine salt may be added in any suitable form, for example, as a powder, in tablets of known amount each, or as an aqueous solution. The latter form is particularly desirable for continuous addition when treating a continuously flowing stream of water of a small flowing water supply. Such a supply might be used for filling up a swimming pool or for any other purpose.

The concentration of chlorine to be added initially has been given above, i. e. enough to provide an available chlorine concentration in the water sufficient to insure complete sterilization in a reasonable time and usually of from about 10 to about 50 parts per million. The amount of the chlorine which will be used up in sterilizing the water depends, of course, upon the amount of contamination originally present therein and hence no rule can be given in this respect. Thus the amount of remaining chlorine will depend upon a balance of the above two factors, i. e. (a) the amount put in and (b) amount which is used up.

In order that the process will lend itself to all possible uses, it is desirable that an amount of the hydrazodicarbonamidine salt be added sufficient to react with all the available chlorine initially added so that there will be ample to react with any amount of available chlorine which may remain after the sterilization process has been complete.

On the other hand, from a broader point of view, all that is necessary is that there be sufficient hydrazodicarbonamidine salt added to react with all the available chlorine present in the water at the time the hydrazodicarbonamidine salt is added. This is effective because a substantial amount of the chlorine initially added may be consumed or converted to the form of chloride in reacting with contaminating material, so that the amount of chlorine remaining as active chlorine may be substantially less than the amount initially added.

The time period is not critical and is not to be considered as a limitation on the present invention, although usually it is from about 3 to about 20 minutes. Longer periods elapsing between chlorination and the adding of the hydrazodicarbonamidine do not interfere with the effectiveness thereof, while on the other hand with higher concentrations of chlorine initially introduced, sterilization may be complete in less than 3 minutes. Inasmuch as the hydrazocarbonamidine salt is itself substantially tasteless and odorless, an excess of this material added to a batch of water does not tend to render that water objectionable to a user. It is contemplated, therefore, that the hydrazodicarbonamidine salt should preferably be added in an amount at least stoichiometrically equivalent to the amount of available chlorine initially added to the batch of water. The high limit, on the other hand, is not critical and in the usual case is dictated by economics rather than by any chemical or physiological principle. Normally there will not be used more than twice the stoichiometric equivalent of the available chlorine initially added for the reason that any amount of hydrazodicarbonamidine salt added in excess of this proportion would serve no useful purpose and would merely add to the cost of the entire operation.

As above set forth, the chlorine is preferably added in the form of an aqueous solution of chlorine or a hypochlorite or aqueous solution thereof. This is so because if the available chlorine were added in the form of a chloramine, the reaction of such compounds with the hydrazodicarbonamidine salt would produce principally azodicarbonamidine, a compound having the formula:

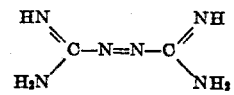

Azodicarbonamidine is tasteless and odorless in the concentrations reasonably present when practicing the present invention, but is ineffective to sterilize the water.

From the point of view of chemical theory, the reaction between the available chlorine and the hydrazodicarbonamidine salt will result usually in converting a large proportion of the available chlorine into azochloramid, which has the formula:

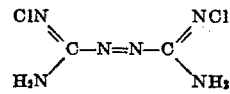

and which is very stable in water, yet which is available to inactivate any micro-organisms which may subsequently find their way into the water. A part of the available chlorine may in some instances be used up in forming the corresponding salt (depending upon which salt of the hydrazodicarbonamidine compound is used) of azodicarbonamidine (see formula above), which is an oxidation product of the hydrazodicarbonamidine. However, in all cases when the present invention is practiced according to the teachings herein, sufficient azochloramid is formed to be effective against recontamination even though some of the available chlorine may be used up (converted to chloride) in forming the azodicarbonamidine salt. Both these compounds and azochloramid are tasteless in the concentrations contemplated for use in accordance with this invention as aforesaid.

It might be supposed that the addition of many of the amino compounds would accomplish the desired purposes of the present invention equally well to that of hydrazodicarbonamidine salt above discussed. At the concentrations of chlorine contemplated for use in accordance with the present invention as above set forth, this is not the case, for the reason that it has been found that many of the chloramines so formed have a taste or odor which is fully as objectionable as the chlorine itself. There are others which have less taste, but have such a slow rate of reaction with available chlorine that unless the amine is present in a huge excess (from 10 to 20 times the stoichiometric equivalent of the available chlorine) the reaction will not take place at the desired rate. Such an excess is objectionable on physiological grounds. As such, therefore, no compound has been found which is considered the equivalent of the hydrazodicarbonamidine salt from the point of view of the present invention.

What is claimed is:

1. The method of sterilizing water, comprising the steps of adding to the water a chlorinating agent, which is selected from the group consisting of aqueous solutions of chlorine, solid water-soluble hypochlorites and aqueous solutions thereof, in an amount to provide a concentration of available chlorine of about 5 to about 100 parts per million and one which is sufficient effectively to sterilize the water, and after a period of time sufficient to permit the available chlorine in the water to sterilize it, adding to the water a water-soluble salt of hydrazodicarbonamidine in an amount which is substantially sufficient chemically to react with all the available chlorine then present.

2. The method of sterilizing water, comprising the steps of adding to the water a chlorinating agent, which is selected from the group consisting of aqueous solutions of chlorine, solid water-soluble hypochlorites and aqueous solutions thereof, in an amount sufficient to provide a concentration of available chlorine in the water of at least five parts per million, and after a period of time sufficient to permit the available chlorine in the water to sterilize it, adding to the water a water-soluble salt of hydrazodicarbonamidine in an amount which is substantially sufficient to react with all the available chlorine then present.

3. The method of sterilizing water in accordance with claim 2, wherein the water being sterilized is flowing as a continuous stream and wherein the chlorine and said salt are substantially continuously supplied to the flowing stream.

4. The method of sterilizing water according to claim 1, wherein the water being sterilized is flowing as a continuous stream, and wherein the chlorine and the hydrazodicarbonamidine salt are continuously added thereto at points in the flow path of the stream separated by a distance sufficient in view of the rate of flow of the stream to provide a substantially predetermined desired time for sterilization by the chlorine prior to the addition of said salt.

5. The method of sterilizing a relatively small quantity of water, which comprises the steps of adding to the batch of water a chlorinating agent, which is selected from the group consisting of aqueous solutions of chlorine, solid water-soluble hypochlorites and aqueous solutions thereof, in an amount sufficient to provide a concentration of available chlorine in the batch of water being sterilized of from about 5 to about 100 parts per million, and after a period of time sufficient to permit the available chlorine to sterilize the water, adding to the batch of water a water-soluble salt of hydrazodicarbonamidine in an amount which is substantially sufficient to react with all the available chlorine then present.

6. The method of sterilizing a relatively small quantity of water, which comprises the steps of adding to the batch of water a chlorinating agent, which is selected from the group consisting of aqueous solutions of chlorine, solid water-soluble hypochlorites and aqueous solutions thereof, in an amount sufficient to provide a concentration of available chlorine in the batch of water being sterilized of from about 10 to about 50 parts per million, and after a period of at least about 3 minutes provided to permit the available chlorine to sterilize the water, adding to the batch of water a water-soluble salt of hydrazodicarbonamidine in an amount which is at least stoichiometrically equivalent to all the available chlorine initially introduced as aforesaid, said salt being at least one selected from the group consisting of the sulfate, hydrochloride, nitrate and acetate of hydrazodicarbonamidine.

7. The method of sterilizing a relatively small quantity of water, which comprises the steps of adding to the batch of water a chlorinating agent, which is selected from the group consisting of aqueous solutions of chlorine, solid water-soluble hypochlorites and aqueous solutions thereof, in an amount sufficient to provide a concentration of available chlorine in the batch of water being sterilized of from about 5 to about 100 parts per million, and after a period of at least about 3 minutes provided to permit the available chlorine to sterilize the water, adding to the batch of water hydrazodicarbonamidine sulfate in an amount which is from one stoichiometric equivalent of to about twice the stoichiometric equivalent of all the available chlorine initially introduced as aforesaid.

8. The method of sterilizing a relatively small quantity of water, which comprises the steps of adding to the batch of water a chlorinating agent, which is selected from the group consisting of aqueous solutions of chlorine, solid water-soluble hydrochlorites and aqueous solutions thereof, in an amount sufficient to provide a concentration of available chlorine in the batch of water being sterilized of from about 10 to about 50 parts per million, and after a period of from about 3 to about 20 minutes provided to permit the available chlorine to sterilize the water, adding to the batch of water hydrazodicarbonamidine sulfate in an amount which is at least stoichiometrically equivalent to all the available chlorine initially introduced as aforesaid, so as to produce in the water a substantial concentration of azochloramid having the formula:

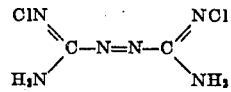

HENRY CLAY MARKS.
FREDE BERNHARDT STRANDSKOV.

REFERENCES CITED

The following references are of record in the file of this patent:

UNITED STATES PATENTS

| Number | Name | Date |
|---|---|---|
| 1,866,524 | Baker et al. | July 12, 1932 |
| 1,890,969 | Chaney | Dec. 13, 1932 |
| 2,018,916 | Krause | Oct. 29, 1935 |
| 2,272,223 | Pietzsch | Feb. 10, 1942 |
| 2,443,429 | Marks et al. | June 15, 1948 |